Figure 1A:
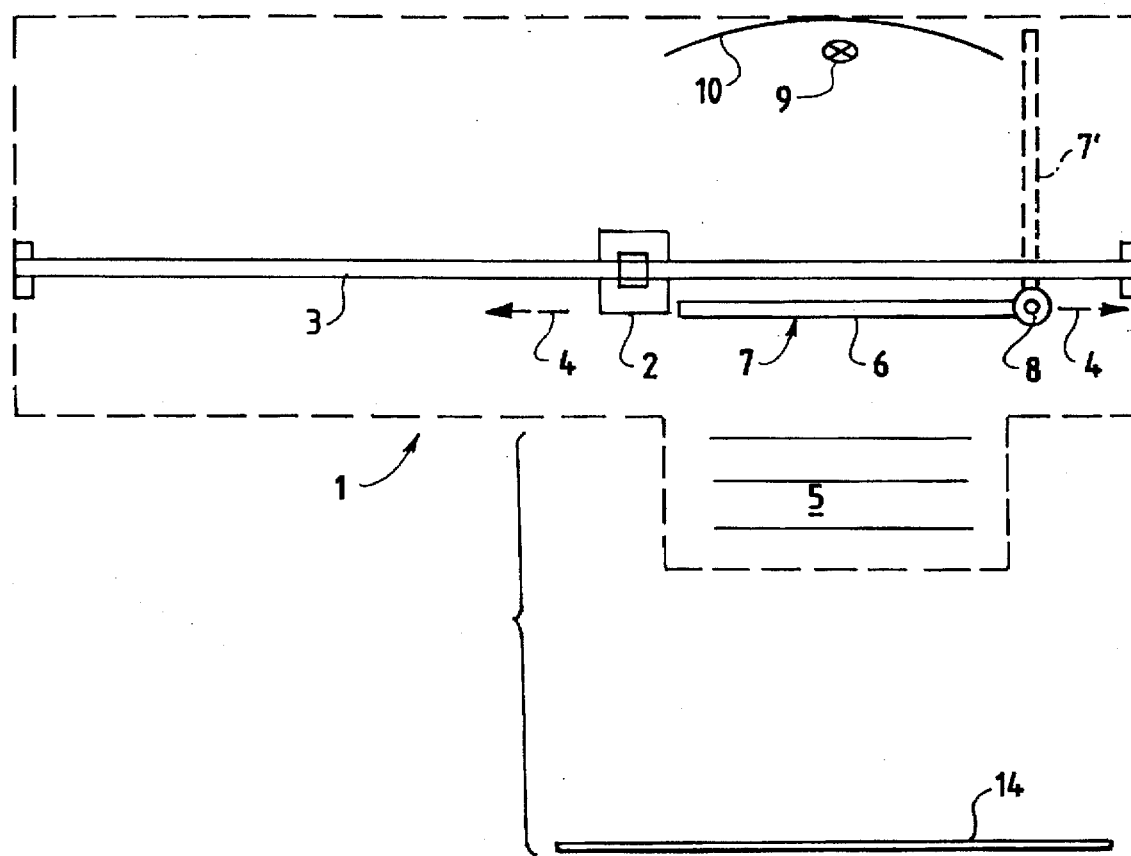

United States Patent [19]

Kirmeier

[11] Patent Number: 5,680,228
[45] Date of Patent: Oct. 21, 1997

[54] COPYING DEVICE WHICH EFFECTS SIMULTANEOUS SCANNING AND PRINTING

[76] Inventor: Josef Kirmeier, Pfannenstielstrasse 12, D-85416 Langenbach, Germany

[21] Appl. No.: 347,359

[22] PCT Filed: Jun. 4, 1993

[86] PCT No.: PCT/EP93/01411

§ 371 Date: Mar. 27, 1995

§ 102(e) Date: Mar. 27, 1995

[87] PCT Pub. No.: WO93/25040

PCT Pub. Date: Dec. 9, 1993

[30] Foreign Application Priority Data

Jun. 4, 1992 [DE] Germany ............... 42 18 506.8

[51] Int. Cl.[6] ........................................... H04J 1/04
[52] U.S. Cl. .................... 358/474; 358/494; 358/496; 358/497
[58] Field of Search ....................... 358/401, 474, 358/494, 496, 497; 348/207; 399/151

[56] References Cited

U.S. PATENT DOCUMENTS

| 3,830,975 | 8/1974 | Putter ............................ 178/30 |
| 3,945,209 | 3/1976 | Dexter ........................... 60/546 |
| 4,150,873 | 4/1979 | Dali ............................... 358/285 |
| 4,272,187 | 6/1981 | Birdsall et al. ................ 355/56 |
| 4,435,723 | 3/1984 | Seimiya et al. ............... 346/154 |

FOREIGN PATENT DOCUMENTS

| 0124098 | 11/1984 | European Pat. Off. . |
| 124 098 | 11/1984 | European Pat. Off. . |
| 0291000 | 11/1988 | European Pat. Off. . |
| 291 000 | 11/1988 | European Pat. Off. . |
| 544 601 | 6/1993 | European Pat. Off. . |
| 31 34 705 | 4/1982 | Germany . |
| 8502274 | 5/1985 | WIPO . |
| WO85/02274 | 5/1985 | WIPO . |
| WO92/20182 | 11/1992 | WIPO . |

Primary Examiner—Kim Vu
Assistant Examiner—Tia M. Harris
Attorney, Agent, or Firm—Marshall, O'Toole, Gerstein, Murray & Borun

[57] ABSTRACT

Copying device with a scanner camera (1) for scanning originals (14) which can be illuminated for the copying process, having an optical system (5) for optical projection of the original and having a photoelectric line sensor (2), at the output (102) of which the electric signals of the individual scanning points are available. The signal output of the line sensor (2) is connected directly to the input of the print mechanism (100) of a per se conventional printer (101). In particular there is provided a hydraulic drive of the line sensor (2) to be moved. With this scanner camera, copies can be made very rapidly one after another.

17 Claims, 4 Drawing Sheets

COPYING DEVICE WHICH EFFECTS SIMULTANEOUS SCANNING AND PRINTING

The present invention relates to a copying device with a scanner camera for scanning originals, which can be illuminated for the copying process, with an optical system for optical projection of the original and with a photoelectric line sensor at the output of which the electric signals of the individual scanning points are available.

From EP-A-124098, a copying device is known with which, by means of a scanner camera with photo-electric line sensor, an illuminated original to be copied is to be scanned. The original lies with the side to be scanned facing upwards and the scanner camera is arranged at a certain distance above this original. The scanner camera has an optical system, which is adjustable for focusing, for optical projection of the original into a predetermined image plane of the camera. In this image plane the projected image is scanned line by line by means of the photo-electric line sensor.

This known scanner camera has a number of additional features, such as e.g. a device for focusing the image of the illuminated original in the image plane of the camera. This arrangement comprises an optically imageable pattern structure with an associated source of illumination, by means of which this pattern structure is to be so illuminated that an image of this master structure, the sharpness of which can be monitored, can be produced in the plane of the original by means of the optical system, through adjustment thereof. A keyboard with individual keys is provided, through the actuation of which individual working processes of the camera can be activated.

The output signal of the line sensor of the camera is fed to an associated computer, in which signal processing of the sensor signals is carried out in accordance with the software provided. With the known scanner camera a CCD line sensor is provided and the output signals of the line sensor are converted in the computer into a computer language provided and processed. From the computer, signals of the scanning process which are prepared in ASCII-format are output, which are suitable for telefax-like transmission to a remote receiving location. However, the ASCII-signal can also be fed to any printer, from which print-outs of the copying process can then be obtained.

In general, computers are so common nowadays that usually a computer need not be additionally obtained for the copying device of the above-mentioned publication: resort can be made one already present for other purposes. Although present-day computers work relatively fast, the copying speed achievable by means of such a known system is satisfactory only to a certain extent.

It is the object of the present invention to provide measures by means of which a copying process can be performed with a scanner camera, which copies from above, at a higher working speed and, moreover, the technical outlay can be reduced, both for black-and-white copies (without half-tones) as well as for copies in which, in the copy, the darkness of the printed signs or characters corresponds to the intermediate value levels of the output signal of the line sensor.

This object is achieved with a copying device having the features of claim 1 for black-and-white copying and those of claim 2 for copies with grey tones. It is of particular advantage to provide also a mechanical implementation of the drive of the line sensor.

In the prior patent application DE-P-41 13 594.6, of Apr. 25, 1991, purpose and exemplary embodiments of a scanner camera are described in detail. With the known copying devices, which are mainly intended for copying individual sheets, copies can be made from books and the like only very inconveniently and at a slow speed. For this problem the copying device which is known from the above-mentioned EP-A-124098 offers some help, in that a book, the individual pages of which are to be copied, is laid on a table and the copying is carried out with a scanner camera which is positioned above the table. The book remains lying on the table, and only the individual pages are turned. With such a working procedure a relatively large number of pages can be copied per time unit, e.g. if one first copies the odd-numbered pages and only then the even-numbered pages, the book and the scanner-camera needing to be newly set up only once for this process. With such a rapid change of the original, the working speed of the copying device plays a not insignificant role, namely as is the case when copying individual sheets with a conventional copier.

With a copying device of the present invention a particularly simplified evaluation of the sensor signals is performed. The invention is based on the idea of avoiding any unnecessary signal processing and of transforming the sensor output signals directly into image points of a printed copy.

Line sensors which have long been known, which e.g. work in accordance with the principle of a CCD array (Charge Coupled Device), provide the sensor signals of the individual image points of the line serially, i.e. temporally one after another. The individual image elements of such a line sensor usually provide electric signals, which correspond to the brightness value of the copied image point. For a black-and-white copy it is sufficient, for the subsequent signal processing, to take a yes/no decision with a level discriminator, namely whether a white or a black image point is involved. If copying with intermediate value levels of each individual image point is desired, the analog signal which is provided by the sensor is used, usually converted into digital values.

Line sensors have also become known, which provide the signal values of the individual image points of the line in parallel at the correspondingly numerous output connections of the line sensor. With such a sensor with parallel output, substantially higher scanning speeds can naturally be achieved.

With the present invention it is provided in particular that the output signals of the sensor line, which correspond with the image points, are directly fed to a printer, namely directly to the signal input of the print mechanism of the printer. Conventional printers have signal inputs which can accept and print out only signals which are present in a particular format. With the present invention one goes directly to the signal input of the print head of a dot-matrix printer or of the beam modulator of a thermal or laser printer.

With the invention, through still a further measure for a trouble-free realisation of the above-mentioned idea, care is taken that no complications arise because the timings of the manner of operation of the line sensor may differ from the line traversal of the printer involved. The image point timing of the line sensor may indeed be somewhat different from the image point timing of the printer head. Therefore, with the present invention, provision is made for the inclusion of (only) a data buffer memory in the direct connection between the electrical output of the line sensor and the signal input of the print mechanism, in addition to the already-indicated level discriminator for black-and-white copying, and the analogue/digital converter for grey scale copying. This buffer memory serves, thus far, merely for making the timing sequence of calls for signals by the print mechanism independent of the timing of the input of the line image point signals, i.e. to balance out time "mis-matches".

In the case of a line sensor with parallel outputs, i.e. with a plurality of signal outputs, the buffer memory also serves for converting the temporally parallel occurrence of image point signals of a line into the series of points of a print line which can be processed by the printer mechanism.

In accordance with this idea of the invention, the print out of the lines of a copy thus occurs simultaneously with the scanning of the corresponding lines of the original.

The direct connection of the output of the sensor line to the input of the print mechanism, in accordance with the invention, does not exclude the possibility of a signal amplifier being included in this connection, as also in this case the signal from the line sensor goes directly to the print mechanism and not to the usual signal input of the printer, which requires a standardised format (e.g. ASCII) of the signal.

A particularly advantageous combination of features is that in which there are combined the above-described rapidly working signal conversion into printed lines and a hydraulic drive for the advancing of the line sensor which works particularly rapidly and trouble-free/oscillation-free.

Further explanation is given in the description with reference to the drawings.

Figure 1B:
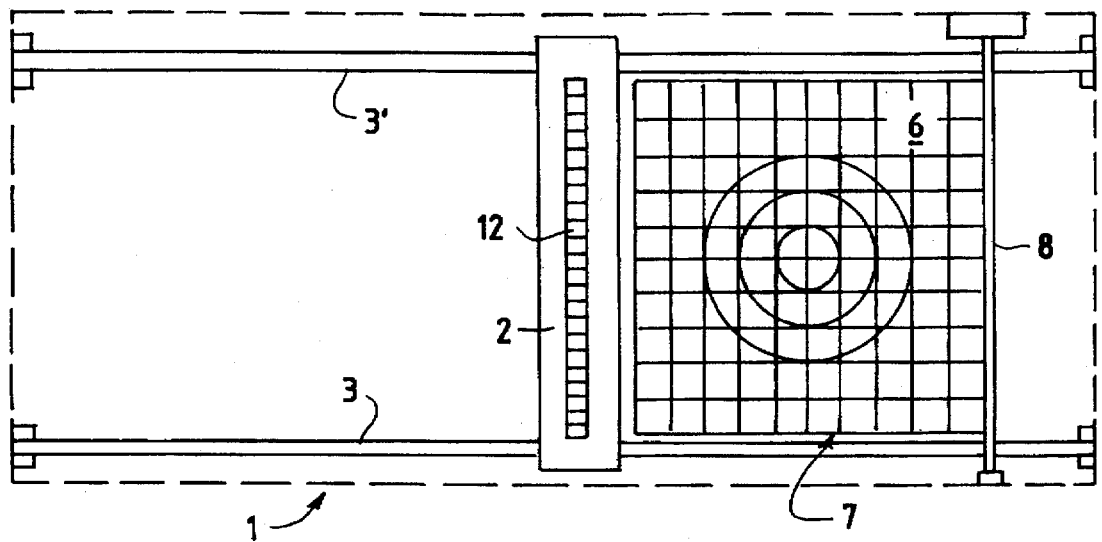
Figure 2:
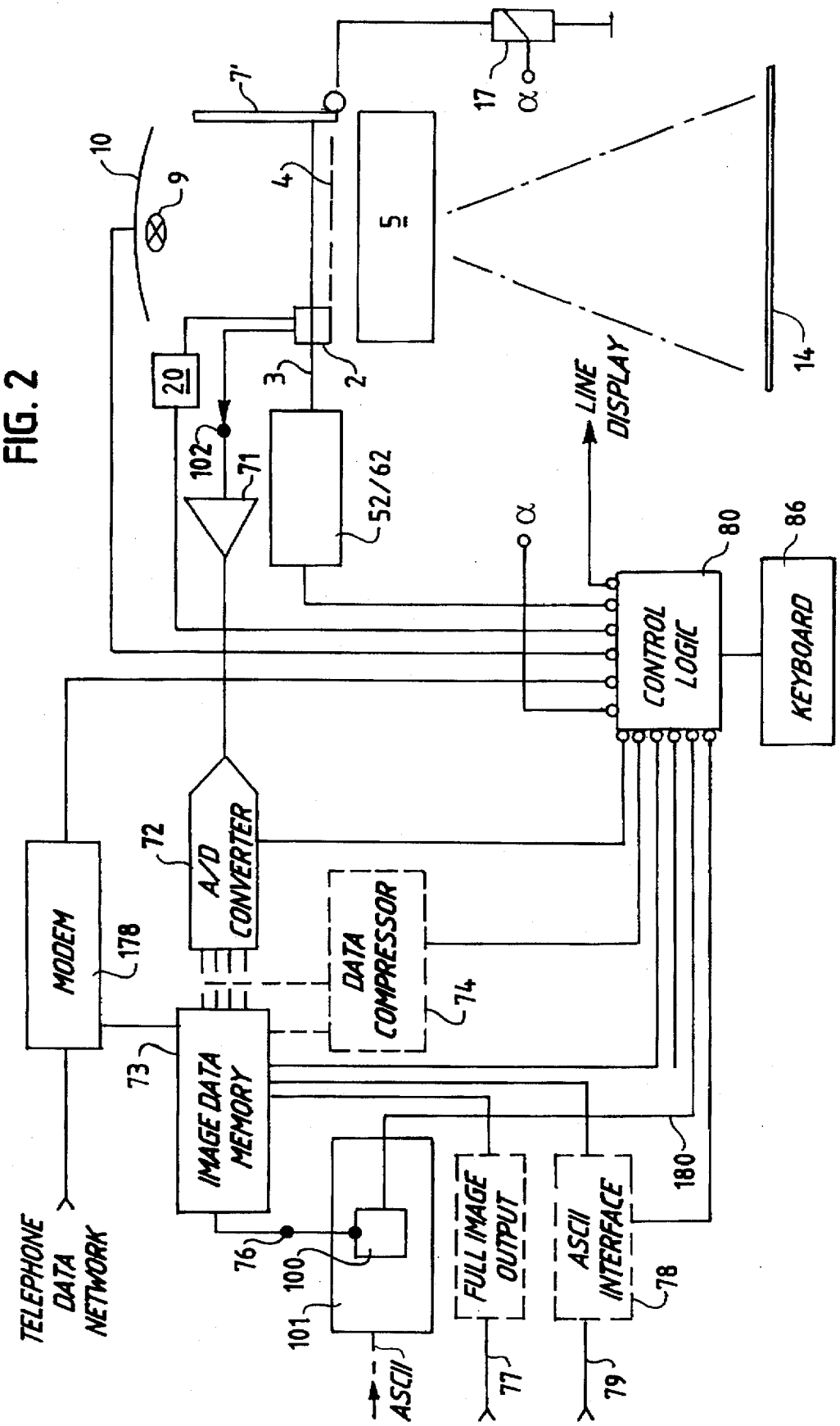

FIG. 1a shows a schematic illustration of a scanner camera as known and as described in more detail in the above-mentioned prior application along with many variants, FIG. 1b shows a view from above, corresponding to the side view of FIG. 1a, FIG. 2 shows the block diagram with the direct connection, according to the invention, of the line sensor output to the signal input of the print mechanism of a printer which is in principle conventional, and FIGS. 3a to 3d show details of particular embodiments of the drive of a line sensor.

In FIGS. 1a and 1b a scanner camera is designated as 1, and has a line sensor 2, with sensor elements 12, which is horizontally moveable on (parallel) guides 3, 3' by means of an appropriate drive. The orientation of the sensor line is perpendicular to the plane of FIG. 1. The image plane is indicated by 4. The optical system, an objective lens which is chosen for the individual situation involved, is designated as 5. Two guides 3, 3' are expediently provided so that the image field in the image plane 4 remains free of disruptive constructional parts and precise guidance is ensured.

For the focusing of the camera a pattern structure 6 is provided, which is found on the surface—in the image plane 4—of a transparent plate 7, e.g. of transparent glass. The folded-away position of plate 7 is indicated by 7'. The schematically illustrated rotation or pivot axis of plate 7 is designated as 8. During the process of focusing, the plate 7 is in the position shown in FIG. 1a. The light source 9 and the focusing means 10 serve for the illumination of the pattern structure.

The object plane, in which the original to be copied lies and onto which the camera is focused, is designated as 14.

Features in FIG. 2 referenced with reference signs of FIG. 1 are as described above. The mechanical drive of the line sensor 2 is designated as 52/62 and the drive for the folding-away of the mirror 7 is designated as 17.

From the keyboard designated as 86, the individual working processes of the copying device are activated by the operator. This is electronically provided by the control logic 80. The operation of the sensor line 2 is thus controlled by the control logic 80 via electronic means 20. The control logic also controls the mechanical drive 52/62 for the "line-by-line" advancing of the sensor line 2. The control line 180 is connected to the printer (mechanism).

The electrical signals delivered by the line sensor 2 when the illuminated original in the object plane 14 is scanned are available at the output 102 of the line sensor.

This output 102 is directly connected with the circuit point 76, if applicable via a pre-amplifier 71, to which the signal input of the print mechanism or print head 100 of the printer 101 is to be connected in accordance with the invention. As can be seen, in substance only the circuit component 72 and the image data buffer memory 73 are additionally included in this direct connection of the points 102 and 76. No adaptation of the line sensor signal to a standard is effected.

The circuit component 72 is, as already described in detail above, either a discriminator for black-and-white copying or an analog-digital converter for copying with half-tones of the individual image points. The image data buffer memory 73 effects interim buffer storage of the instantaneous output signals of the circuit component 72 corresponding to the duration of a predetermined time period. The memory makes e.g. the timing of printing of the image points independent of the temporal sequence of the input of the image point signals. Here, buffer storage times which are significantly smaller than the time taken to read out a line are involved.

A data compressor 74 may also be provided.

The signals which are to be directly transformed into printed image points are present at the input 76 for the print mechanism 100. This print mechanism may be a dot-matrix print head. It may also be an optical print head which delivers a light/heat beam for thermal printing or a laser beam for laser printing. Half-tones can be achieved by appropriate modulation of the print intensity. With thermal printers, this is a long known intensity modulation with greater or lesser blackening of the printed point.

New laser printers are also capable of generating print points of differing darkness.

As time period, or as storage period for the intermediate buffer memory 73 there may also be provide a longer interval of time, e.g. the duration of the scanning of e.g. three lines, of a full sheet or even of n sheets. For example, the connection 77 may be provided for a full image output.

An ASCII output, also provided if appropriate, is designated by 79.

An extended buffer memory time may be provided in particular as necessary for print out via a fax connection for storage on an optical disk or a magnetic memory and the like, as a result of their slower working speed.

Figure 3A:
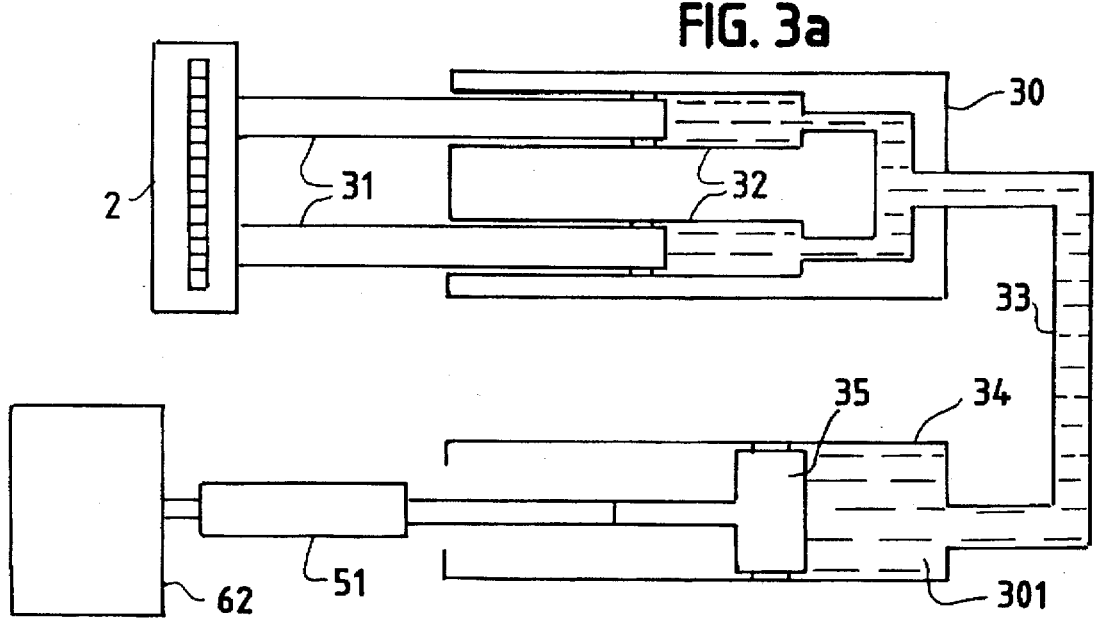
Figure 3B:
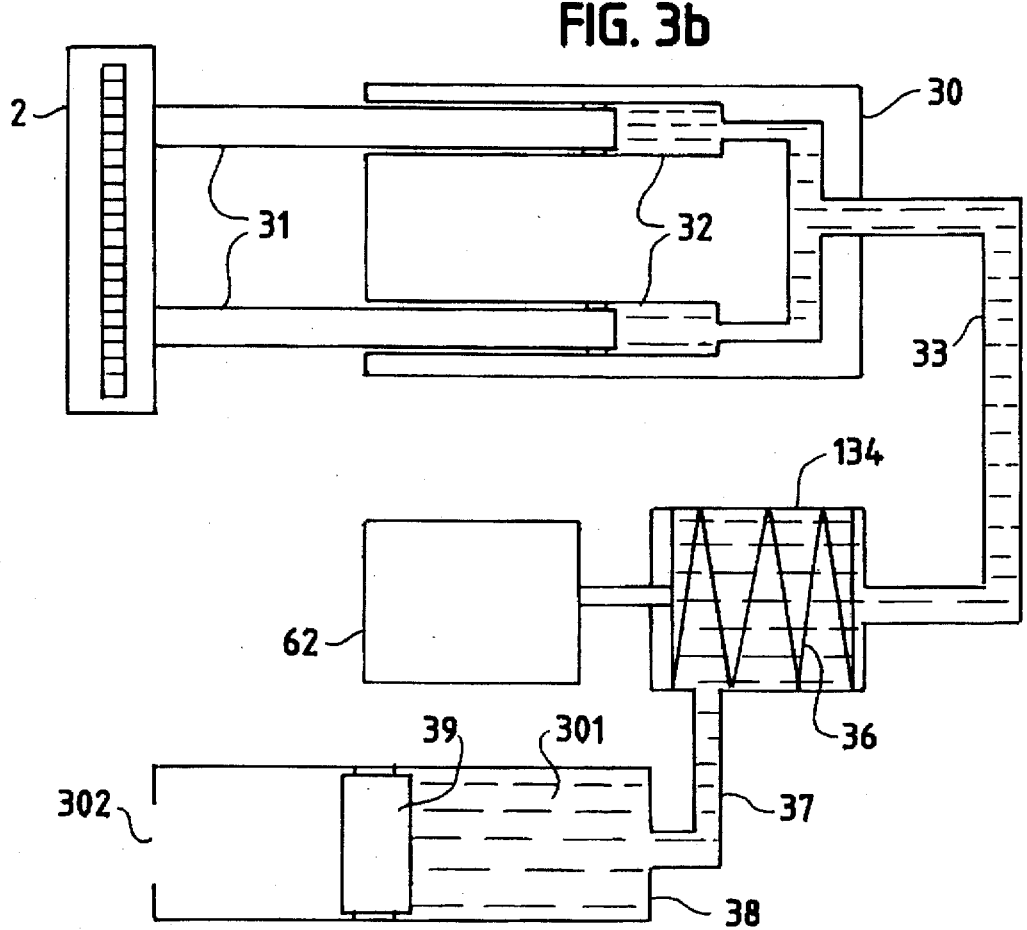
Figure 3C:
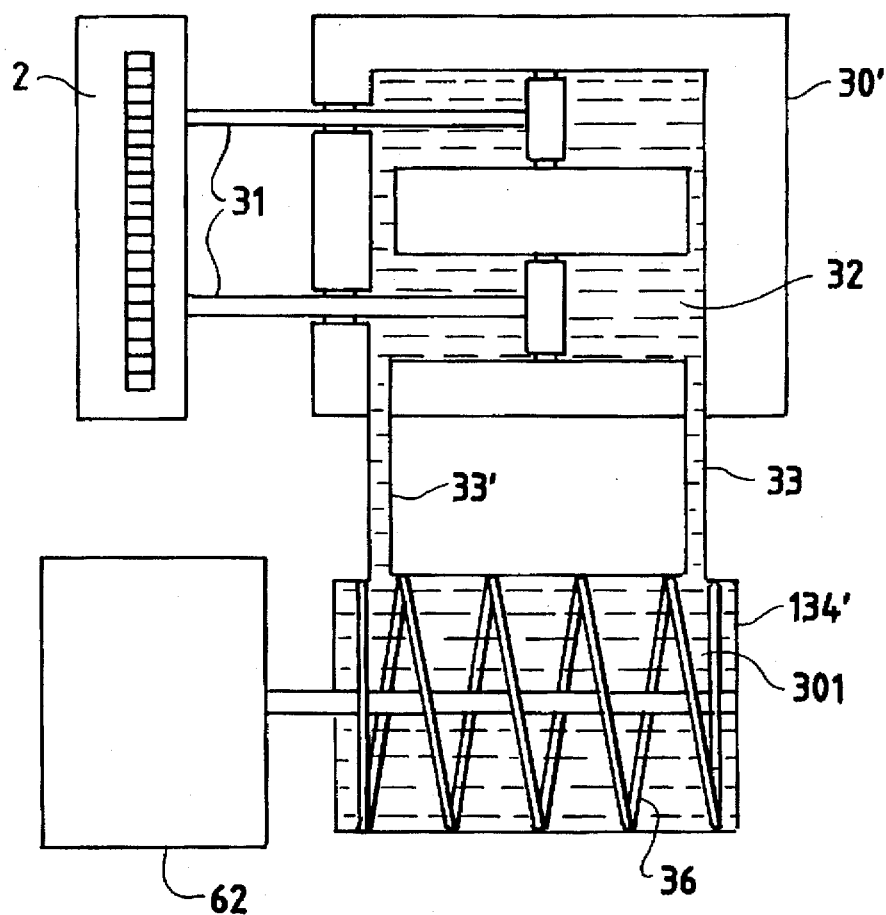

In order to be able to move the line sensor 2 in its guides above the image plane particularly rapidly and also exactly/without vibration in the image plane of the camera, in particular with a speed of more than 50 mm/sec, a hydraulic drive system in accordance with FIGS. 3a, 3b or 3c is provided according to a further development of the invention.

A hydraulic medium 301 in a connection line 33 is set in motion by a master cylinder/piston unit 34, 35 driven by a positioning/stepping motor. In a slave piston/cylinder unit 30, 31, 32, this hydraulic medium displaces the, for example two parallel, cylinders 31, with which the line sensor - displaceable in its guides - is mechanically coupled. This drive is free from oscillations of the drive movement, whereby damping means may be additionally provided. Between the motor 62 and the master piston 35 a viscous spring coupling 51 or the like may be provided.

This hydraulic drive system may be operated with pressure in the direction of the slave unit 30, but may also be operated in the opposite direction by the generation of "under pressure" in the master cylinder 34. The line sensor can thus be controllably driven to and fro by the motor 62.

Because of the tandem system of the slave unit 30 there is ensured absolute equality and uniformity of the parallel drive of the line sensor 2, as a consequence of the principles of hydraulics.

A non-resinous hydraulic medium with sufficiently high boiling point should be used. Through the choice of hydraulic transmission between the master and slave units positions exact even to 1 µm and steps of 1 µm can be achieved without disruption.

A variant of the drive system of FIG. 3a is shown in FIG. 3b. Details of FIG. 3b already described with reference to FIG. 3a apply correspondingly. The variant of FIG. 3b provides, for transport of the hydraulic medium, a transport screw 36 in a cylinder 134 of the master unit, which screw transports fluid in both directions along its axis. Here, the motor 62 drives the rotation of the transport screw 36. This variant is particularly suitable for displacing the line sensor in both directions. 38 designates an equalization reservoir, closed by a displaceable piston 39, with an opening 302.

Figure 3D:
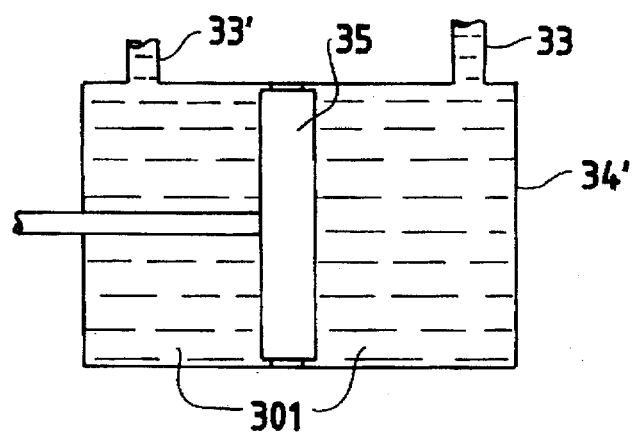

FIGS. 3c and 3d show a further variant. The configuration of FIG. 3c corresponds in substance to that of FIG. 3b. Described details of FIG. 3b thus apply also to the configuration shown in FIG. 3c, in which, however, the described equalization reservoir 38 can be omitted. Here, the master unit 134', 36 is an arrangement which delivers on two sides, and the slave unit 30', 31 is formed correspondingly to work on two sides. The respective second sides of the master unit and slave unit are connected by the second, equalization connection line 33' provided in this case, so that overall an equalization in terms of volume is always present.

FIG. 3d shows as a detail view a master unit 34' with a piston 35 working double sidedly. This master unit according to FIG. 3d is to be employed in place of the master unit 36, having a transport screw, of FIG. 3c, and is to be connected via the lines 33 and 33'.

I claim:

1. Copying device with a scanner camera for scanning originals which can be illuminated for the copying process, having an adjustable optical system for optical projection of the original from an object plane into a predetermined image plane of the camera, having a photoelectric line sensor, by means of which an image point scanning of a predetermined projection area in the image plane of the camera can be performed, and at the output of which the electric signals of the individual scanning points are available, characterized in that, for the print out of a copy of the original, which occurs simultaneously with the signals that become available at the output of the line sensor during the copying process, the output of the line sensor is connected to the signal input of the print mechanism of a printer such that the line sensor is connected through, in the case of black-and-white copying, a level discriminator or, in the case of copying with intermediate value levels of the output signal, an analog/digital converter, and through an image data buffer memory to the print mechanism, characterized in that, the line sensor is moved in a step-wise manner by means of a hydraulic drive system which has a master cylinder/piston unit driven by a positioning/stepping motor and a slave piston/cylinder device mechanically connected to the line sensor, and characterized in that, for the process of simultaneous print out of the copy there is provided relative to the scanning process a predetermined range for a temporal displacement of the two processes.

2. Copying device with a scanner camera for scanning originals which can be illuminated for the copying process, having an adjustable optical system for optical projection of the original from an object plane into a predetermined image plane of the camera, having a photoelectric line sensor, by means of which an image point scanning of a predetermined projection area in the image plane of the camera can be performed, and at the output of which the electric signals of the individual scanning points are available, characterized in that, for the print out of a copy of the original, which occurs simultaneously with the signals that become available at the output of the line sensor during the copying process, the output of the line sensor is connected to the signal input of the print mechanism of a printer such that the line sensor is connected through, in the case of black-and-white copying, a level discriminator or: in the case of copying with intermediate value levels of the output signal: an analog/digital converter, and through an image data buffer memory to the print mechanism, characterized in that, the line sensor is moved in a step-wise manner by means of a hydraulic drive system which has a master cylinder/piston unit driven by a positioning/stepping motor and a slave piston/cylinder device mechanically connected to the line sensor, and characterized in that, this drive system comprises a master unit having a driven arrangement which controllably transports a hydraulic medium on two sides thereof, first and second hydraulic connection lines, and a slave unit which receives the hydraulic medium on two opposing sides thereof.

3. A copying device having a scanner camera for scanning an original, an adjustable optical system which projects the original from an object plane into a predetermined image plane of the camera, and a photoelectric line sensor capable of scanning image points of a predetermined projection area in the image plane of the camera, and capable of providing electric signals of the individual scanning points at an output thereof, characterized in that, the output of the line sensor is connected to a signal input of a print mechanism through a level discriminator and an image data buffer memory so that the print out of a copy of the original occurs simultaneously with the electric signals of the individual scanning points that becoming available at the output of the line sensor during the scanning process, and a hydraulic drive system having a positioning/stopping motor moves the line sensor in a step-wise manner.

4. The copying device according to claim 3, wherein a signal amplifier is connected between the line sensor output and the signal input of the print mechanism.

5. The copying device according to claim 3, wherein, during the process of simultaneous print out of the copy, there is provided, relative to the scanning process, a predetermined range for a temporal displacement of the two processes.

6. The copying device according to claim 3, wherein the drive system includes a master cylinder/piston unit driven by the positioning/stepping motor and a slave cylinder/piston unit mechanically connected to the line sensor.

7. The copying device according to claim 6, wherein the slave piston/cylinder unit has two parallel running pistons which are in the same pushing/pulling connection with the line sensor.

8. The copying device according to claim 3, wherein the drive system comprises a master cylinder/piston unit having a driven arrangement which controllably transports a hydraulic medium on two sides thereof, first and second hydraulic connection lines, and a slave piston/cylinder unit having a piston arrangement which receives a hydraulic medium on two opposing sides thereof.

9. The copying device according to claim 6, wherein the master cylinder/piston unit includes an arrangement which transports a hydraulic medium on two opposing sides thereof.

10. The copying device according to claim 3, wherein the level discriminator comprises an analog/digital converter capable of discriminating between intermediate value levels.

11. The copying device according to claim 3, wherein the line sensor scans a line at a line scan rate and wherein electric signals of the individual scanning points are provided to the signal input of the print mechanism within one period of the line scan rate.

12. A copying device having a scanner camera for scanning an original, an adjustable optical system which projects the original from an object plane into a predetermined image plane of the camera, and a photoelectric line sensor capable of scanning image points of a predetermined projection area in the image plane of the camera, and capable of providing electric signals of the individual scanning points at an output thereof, wherein, the output of the line sensor is connected to a signal input of a print mechanism through a level discriminator and an image data buffer memory so that the print out of a copy of the original occurs simultaneously with the electric signals of the individual scanning points becoming available at the output of the line sensor during the scanning process, and including a drive system having a positioning/stopping motor that moves the line sensor in a step-wise manner.

13. The copying device according to claim 12, wherein a signal amplifier is connected between the line sensor output and the signal input of the print mechanism.

14. The copying device according to claim 12, wherein, during the process of simultaneous print out of the copy, there is provided, relative to the scanning process, a predetermined range for a temporal displacement of the two processes.

15. The copying device according to claim 12, wherein the level discriminator comprises an analog/digital converter capable of discriminating between intermediate value levels.

16. The copying device according to claim 12, wherein the line sensor scans a line at a line scan rate and wherein electric signals of the individual scanning points are provided to the signal input of the print mechanism within one period of the line scan rate.

17. A copying device with a scanner camera for scanning originals which can be illuminated for the copying process, having an adjustable optical system for optical projection of the original from an object plane into a predetermined image plane of the camera, having a photoelectric line sensor, by means of which an image point scanning of a predetermined projection area in the image plane of the camera can be performed, and at the output of which the electric signals of the individual scanning points are available wherein, for the print out of a copy of the original, which occurs simultaneously with the signals that become available at the output of the line sensor during the copying process, the output of the line sensor is connected directly to the signal input of the print mechanism of a printer which is provided, in the case of black-and-white copying by way of a level discriminator or in the case of copying with intermediate value levels of the output signal by way of an analog/digital converter, and by way of an image data buffer memory, wherein the line sensor is moved in a step-wise manner by means of a drive system driven by a positioning/stepping motor mechanically connected to the line sensor, and wherein, for the process of simultaneous print out of the copy there is provided relative to the scanning process a predetermined range for a temporal displacement of the two processes.

* * * * *